United States Patent
Windecker

(10) Patent No.: US 7,352,738 B2
(45) Date of Patent: Apr. 1, 2008

(54) METHOD AND DEVICE FOR TRANSMITTING INFORMATION FORMED OF A SPEECH PART AND A DATA PART

(75) Inventor: Rainer Windecker, Kreuzlingen (CH)

(73) Assignee: Siemens Aktiengesellschaft, Munich (DE)

( * ) Notice: Subject to any disclaimer, the term of this patent is extended or adjusted under 35 U.S.C. 154(b) by 864 days.

(21) Appl. No.: 10/381,786

(22) PCT Filed: Sep. 14, 2001

(86) PCT No.: PCT/DE01/03543

§ 371 (c)(1), (2), (4) Date: Mar. 28, 2003

(87) PCT Pub. No.: WO02/28051

PCT Pub. Date: Apr. 4, 2002

(65) Prior Publication Data

US 2003/0177260 A1    Sep. 18, 2003

(30) Foreign Application Priority Data

Sep. 28, 2000  (DE) ................................ 100 48 167

(51) Int. Cl.
*H04L 29/02* (2006.01)
(52) U.S. Cl. ...................... 370/352; 370/493
(58) Field of Classification Search ................ 370/352, 370/353, 354, 356, 493
See application file for complete search history.

(56) References Cited

U.S. PATENT DOCUMENTS 5,586,193 A * 12/1996 Ichise et al. ................ 381/106
6,353,609 B1 * 3/2002 Ethridge et al. ............. 370/352
6,449,658 B1 * 9/2002 Lafe et al. ................... 709/247
6,587,454 B1 * 7/2003 Lamb .......................... 370/352
6,646,674 B1 * 11/2003 Kato ........................ 348/14.13
6,839,341 B1 * 1/2005 Nakajima .................... 370/352
7,085,261 B2 * 8/2006 Ethridge et al. ............. 370/352
7,190,284 B1 * 3/2007 Dye et al. ...................... 341/51
2001/0036171 A1 * 11/2001 Tonnby et al. ............... 370/352
2002/0016161 A1 * 2/2002 Dellien et al. ............... 455/403
2006/0165066 A1 * 7/2006 Campbell et al. ........... 370/352

FOREIGN PATENT DOCUMENTS

WO    98/44712    10/1998
WO    99/66759    12/1999

OTHER PUBLICATIONS

Petra Adamik, "Sprache auf dem Datenhighway", Funkschau, Jul. 1999, pp. 35-40.
Elmar Török, "IP-Nebenstellenanlagen für Unternehmen", Funkschau, Jun. 2000, pp. 30-33.
Thomas Doumas, "Next Generation Telephony: A Look at Session Initiation Protocol", Hewlett-Packard Co., Apr. 5, 1999, pp. 1-21.
M. Handley et al., "SDP: Session Description Protocol", Network Working Group RFC 2327, Apr. 1998, pp. 1-42.

(Continued)

*Primary Examiner*—Min Jung
(74) *Attorney, Agent, or Firm*—Staas & Halsey LLP

(57) ABSTRACT

In a communication system for Internet protocol (IP)-based transmission of information formed of a speech part and a data part between interface units with a plurality of ports, the speech part and the data part are transmitted to separate ports of the receiving interface unit. The ports that used are allocated to each other in the communication system as corresponding ports.

16 Claims, 2 Drawing Sheets

OTHER PUBLICATIONS

Henning Schulzrinne et al., "Internet Telephony: Architecture and Protocols—an IETF Perspective", Computer Networks, vol. 31, 1999, pp. 237-255.

Gonzalo Camarillo, "SDP Media Alignment in SIP", 48th IETF MMusic WG, Ericsson Advanced Signalling Research Lab, 7 pp.

"ITU-T H.323, Packet Based Multimedia Communications System", International Telecommunication Union, 1999, pp. 1-129.

Kotha, "Deploying H.323 Applications in Cisco Networks", Cisco Systems, 1998, pp. 1-14.

J. Reynolds et al., "Assigned Numbers", IETF, Network Working Group, Request for Comments 1700, Oct. 1994.

European Search Report, mailed Dec. 6, 2005 and issued in corresponding European Patent Application No. 01 974 041.4-1244.

* cited by examiner

METHOD AND DEVICE FOR TRANSMITTING INFORMATION FORMED OF A SPEECH PART AND A DATA PART

CROSS REFERENCE TO RELATED APPLICATIONS

This application is based on and hereby claims priority to German Application No. 100 48 167.1 filed on Sep. 28, 2000, the contents of which are hereby incorporated by reference.

BACKGROUND OF THE INVENTION

1. Field of the Invention

The invention relates to a method and a device for Internet Protocol (IP)-based transmission of information formed of a speech part and a data part in a communication system.

2. Description of the Related Art

As computers are integrated into communication services, IP-based transmission of information is also being increasingly used in communication systems. In addition to transmitting voice information for telephone services, information with both speech and data content is also being transmitted for several applications, such as video conferencing.

To ensure an optimum transmission speed or transmission bandwidth, the information is compressed before transmission. The speech part can be compressed with some loss. The algorithm used for this can however not be used for the data part of the information as this would lead to unwanted loss of information.

Furthermore, it is preferable to transmit the parts using different transport protocols. Accordingly, the information to be transmitted is divided into speech and data parts and transmitted separately.

FIG. 3 is a block diagram showing a device for transmitting information in a traditional communication system. The information from a sender 10 for a receiver 40 is first divided by an interface unit 20 into a speech part and a data part and then transmitted to a second interface unit 30. The separate transmission of the parts is controlled by a control message (arrow with dotted line). The arrow represents bi-directional data traffic as receipt is usually confirmed by a control message.

A traditional transmission operation in interface units 20 and 30 is shown in the left and right halves of FIG. 4. The first interface unit 20 receives information that comprises a speech part and data part from the sender 10 to be transmitted to the receiver 40. In the first stage (dividing), the information is divided into its component parts. In the second stage (coding), the speech and data parts are compressed and formatted according to the protocols used. The speech and data parts are transmitted to two different ports on the second interface unit 30.

So that the second interface unit 30 recognizes the identity of the parts, an appropriate control message is sent at a higher protocol level. In this example, a H.323 message is used to inform the second interface unit about the two ports. H.323 is a standard that defines components, procedures and protocols for audio-visual communication over packet-switched networks.

In a first stage (decoding), the second interface unit 30 interprets the received H.323 message and allocates the parts accordingly. In a second stage (combining), the original information formed from the parts is combined so that it can be forwarded to the receiver 40.

Since a connection has to be set up using the control message before transmission can occur, there is a time delay caused by transmitting, answering and processing the control message.

SUMMARY OF THE INVENTION

An object of the invention is to provide a method and a device that avoids the time delay attributable to the control message.

According to the present invention in a communication system that uses Internet Protocol (IP)-based transmission of information formed of a speech part and a data part from a first to a second interface unit, the information will be divided into speech and data parts and transmitted using different ports. In the second interface unit, the corresponding transmitted speech and data parts are allocated using dedicated ports. Corresponding information is transmitted to corresponding ports, making an additional control message unnecessary.

In a preferred embodiment of the method, more than two ports are dedicated as corresponding ports. The interface unit can therefore select the appropriate combination of ports required for the information.

In a further preferred embodiment of the method, the data part is transmitted using a Transmission Control Protocol (TCP) that guarantees a dedicated sequence of data packets and error correction. It is further preferable to transmit the speech part using a User Datagram Protocol (UDP), since UDP guarantees a higher transmission speed.

In a further embodiment of the method, the data part contains a combination of types of data, supporting various types of data and applications.

According to a preferred embodiment of the method, the information is divided into a speech part and a data part in the scope of the first interface unit. This means that the method can be used independently from the interfaces of different applications.

According to a preferred embodiment of the method, the speech part is compressed with some loss before transmission to achieve a faster transmission.

According to the present invention, a device in a communication system with two interface units with a plurality of ports realizes the required method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
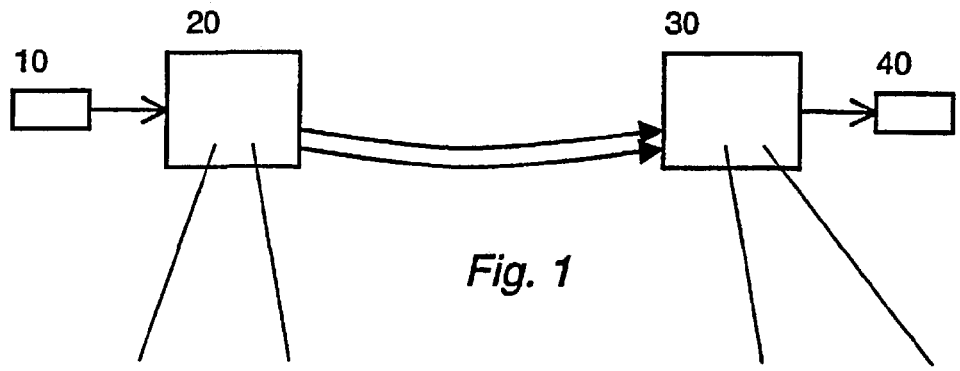
FIG. 1 is a block diagram of a device according to the present invention in a communication system.

Reference will now be made in detail to the preferred embodiments of the present invention, examples of which are illustrated in the accompanying drawings, wherein like reference numerals refer to like elements throughout.

FIG. 1 shows a device according to the present invention with a sender 10, a receiver 40, a first interface unit 20 and a second interface unit 30. The information to be transmitted from the sender 10 to the receiver 40 is divided into a speech part and a data part using two ports and transmitted from the first interface unit 20 to the second interface unit 30. A first port is assigned for the speech part, a second for the data part.

Figure 2:
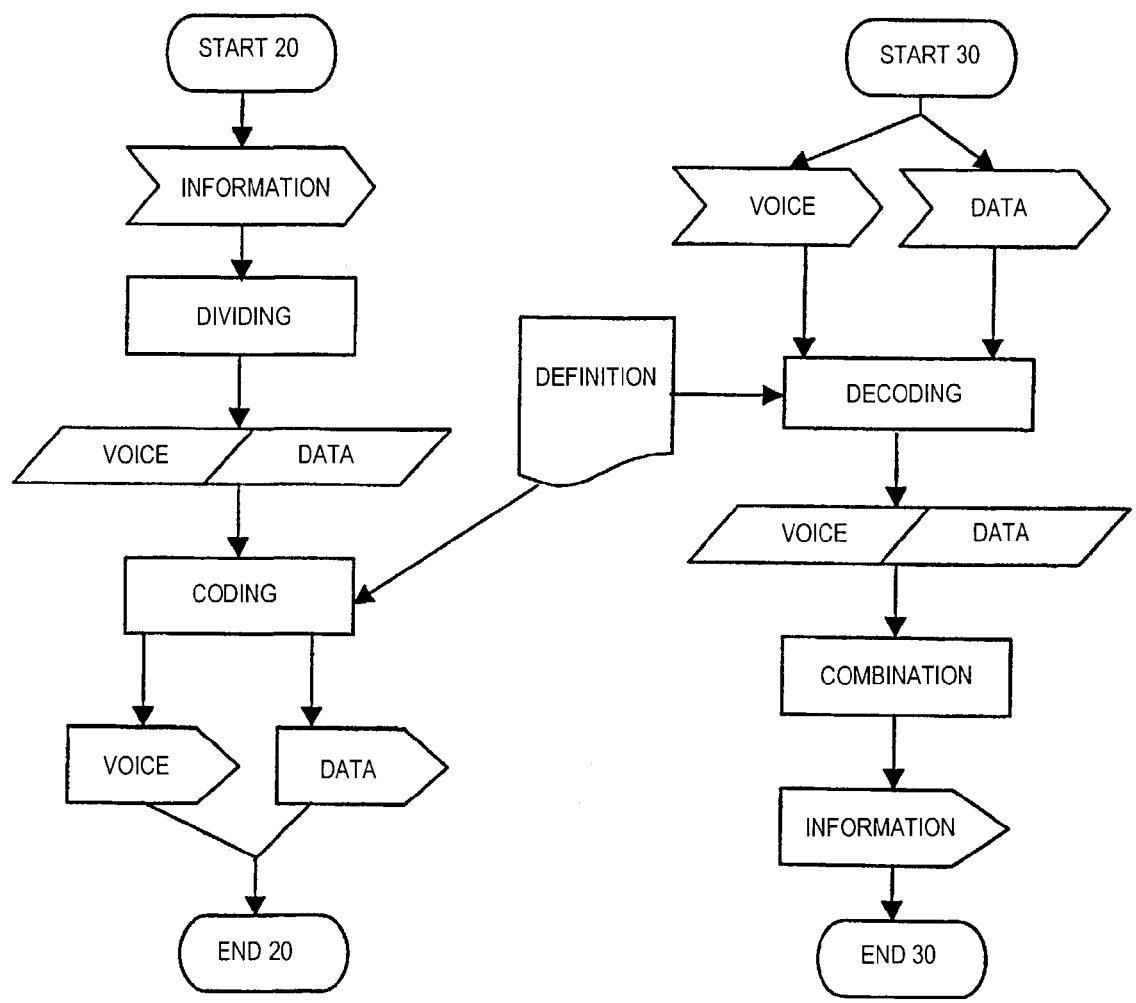
FIG. 2 is a flowchart of a method according to the present invention for the first and second interface units from FIG. 1.
Figure 3:
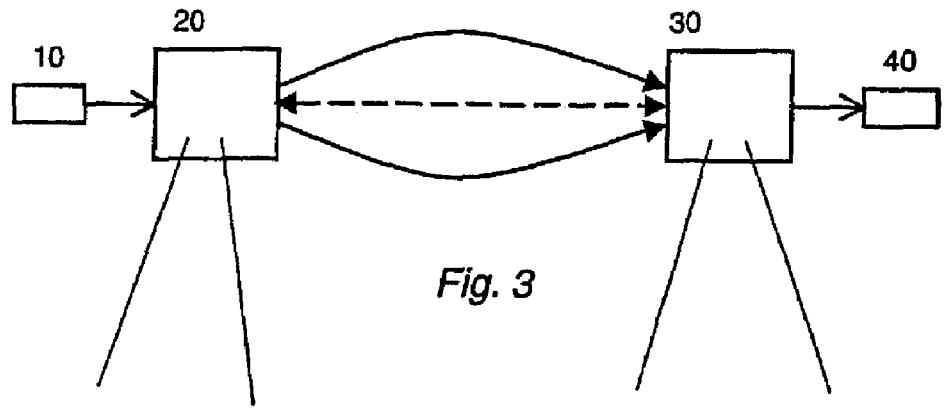
FIG. 3 is a block diagram of a device in a standard communication system.

The left-hand side of FIG. 2 describes a sample process in the first interface unit 20. In a first stage (dividing), the information received and to be transmitted is divided into a speech part and a data part. Sequences from dual-tone multi-frequency dialing may be used as characterizing features for data parts. In the second stage (coding), the speech part with some loss is compressed, while the data part is compressed without loss using an algorithm. The data part is then transmitted using TCP and the speech part using UDP to two different ports on the second interface unit 30. Ports used for transmitting data are allocated according to a list (definition) that assigns ports either individually, in pairs or in groups to a connection.

The process in the second interface unit 30 is shown in the right-hand side of FIG. 2. The speech part and the data part of the information are received at 30 different ports. In a first stage (decoding), the parts are decompressed separately and then assigned to one another according to the definition. To forward the information to the receiver 40, in a second stage (combining), the speech part and data part are combined into complete information again.

Figure 4:
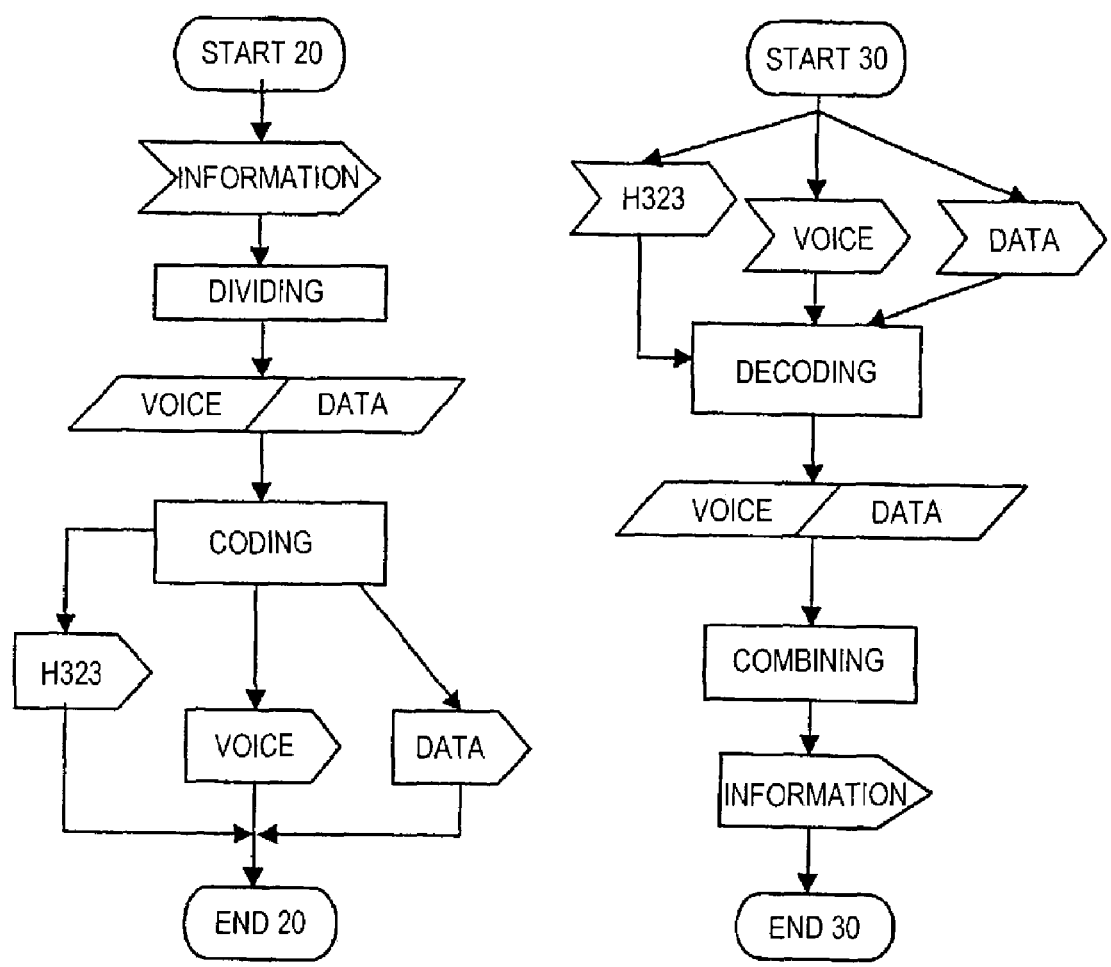
FIG. 4 is a flowchart of a standard method for the first and second interface units from FIG. 3.

As a connection between sender 10 and receiver 40 normally comprises an information stream, that is split into individual data packets at the latest in the Internet Protocol, FIGS. 2 and 4 only show the principle of the method and not a necessary time scale.

Transmission Control Protocol (TCP) and User Datagram Protocol (UDP) are known as IP-based transport protocols. TCP is used for transmitting data, as the connection-oriented transport service TCP guarantees a complete, error-free transmission with dedicated sequence of packets. The connection-free UDP offers a higher speed for transmission as the connection set up, clear down and confirmation is not needed during communication. With both UDP and TCP, the transmitted packets are assigned to the source and target applications via the ports.

The data part can comprise graphic data, other types of data or a combination of graphic data and other types of data. This means that the data part may be significantly greater than the speech part. In this case or if an application makes greater demands on the transmission speed of the data part, then it may be sensible to use three ports for the data part and one port for the speech part. For this type of use, the combination of ports must be planned into the definition.

The sender 10 and the receiver 40 may be video telephones or computers with microphones. The interface units 20 and 30 may be gateways or an agent in a communication system, for which information streams occur with information of a connection, mixed or unforeseeable with speech and data parts. The information may be at the interface unit or already divided into its component parts. The interface units can also be end units, if the end units are a plurality of interfaces.

The invention has been described in detail with particular reference to preferred embodiments thereof and examples, but it will be understood that variations and modifications can be effected within the spirit and scope of the invention.

The invention claimed is:

1. A method for Internet Protocol-based transmission of information formed of a speech part and a data part in a communications system between interface units with a plurality of ports, comprising:
   obtaining information, divided into speech and data parts, at a first interface unit;
   compressing the speech part using a lossy algorithm and compressing the data part using a lossless algorithm to obtain compressed speech and compressed data;
   transmitting the compressed speech and the compressed data from the first interface unit to a second interface unit, using different ports of the first interface unit for the compressed speech and the compressed data, respectively; and
   receiving the compressed speech and the compressed data at the second interface unit using dedicated ports corresponding to the speech and data parts.

2. A method according to claim 1, wherein more than two of the dedicated ports correspond to the speech and data parts.

3. A method according to claim 2, wherein said transmitting of the compressed data uses a Transmission Control Protocol.

4. A method according to claim 3, wherein said transmitting of the compressed speech uses a User Data Protocol.

5. A method according to claim 4, wherein the data part contains graphics data.

6. A method according to claim 5, wherein the data part contains different types of data.

7. A method according to claim 6, further comprising dividing the information into the speech and data parts in the first interface unit.

8. A method according to claim 7, further comprising:
   decompressing in the second interface unit the compressed speech and the compressed data to obtain the speech and data parts; and
   combining the speech and data parts in the second interface unit.

9. A method according to claim 1, further comprising at the second interface unit:
   decoding the compressed speech and the compressed data in accordance with the lossy and lossless algorithms, respectively, to obtain decoded voice and data parts; and
   combining the decoded voice and data parts to reproduce the information.

10. A communication system using a transmission medium for Internet Protocol-based transmission of information formed of a speech part and a data part, comprising:
    a first interface unit obtaining information divided into speech and data parts, compressing the speech part using a lossy algorithm and compressing the data part using a lossless algorithm to obtain compressed speech and compressed data and sending the compressed speech and the compressed data using different ports for the compressed speech and data; and
    a second interface unit receiving the compressed speech and compressed data at dedicated ports allocated to the speech and data parts of the information.

11. A communication system according to claim 10, wherein more than two of the dedicated ports correspond to the speech and data parts.

12. A communication system according to claim 11, wherein said first interface unit transmits the compressed data using a Transmission Control Protocol.

13. A communication system according to claim 12, wherein said first interface unit transmits the compressed speech using a User Data Protocol.

14. A communication system according to claim 13, wherein the data part contains graphics data.

15. A communication system according to claim 14, wherein the data part contains different types of data.

16. A communication system according to claim 10, wherein said second interface unit decompresses the compressed speech and the compressed data in accordance with the lossy and lossless algorithms, respectively, to obtain decoded voice and data parts and combines the decoded voice and data parts to reproduce the information.

* * * * *